A. W. H. GRIEPE.
INTERNAL COMBUSTION TURBINE ENGINE.
APPLICATION FILED FEB. 17, 1914.
1,150,361.
Patented Aug. 17, 1915.
3 SHEETS—SHEET 1.
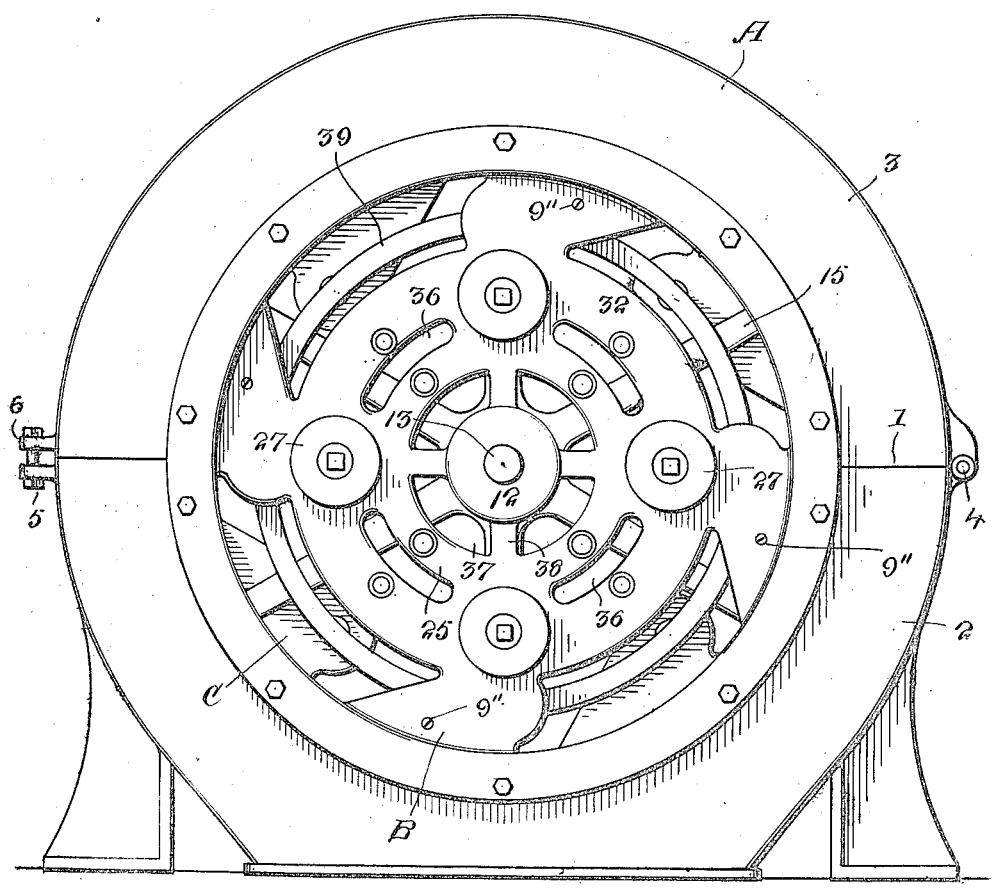
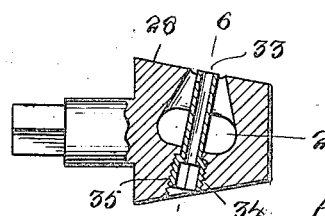

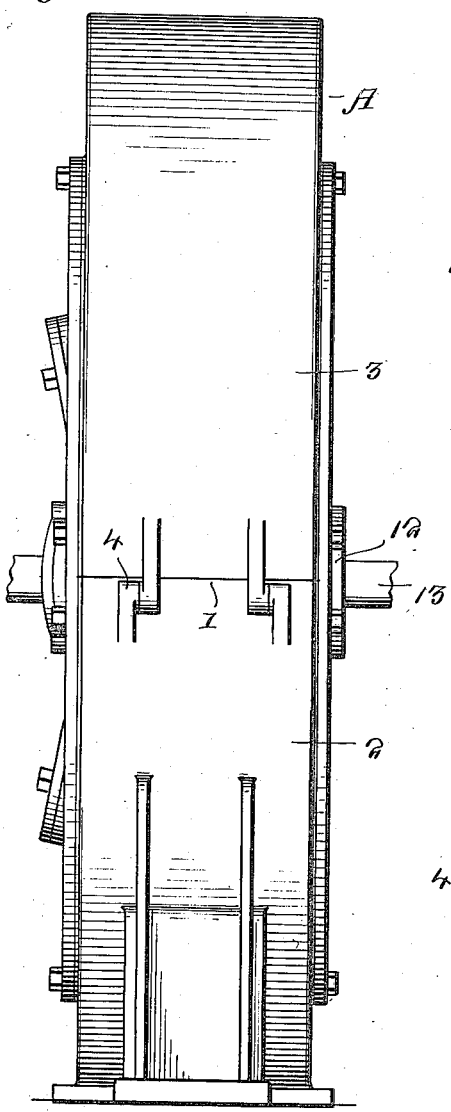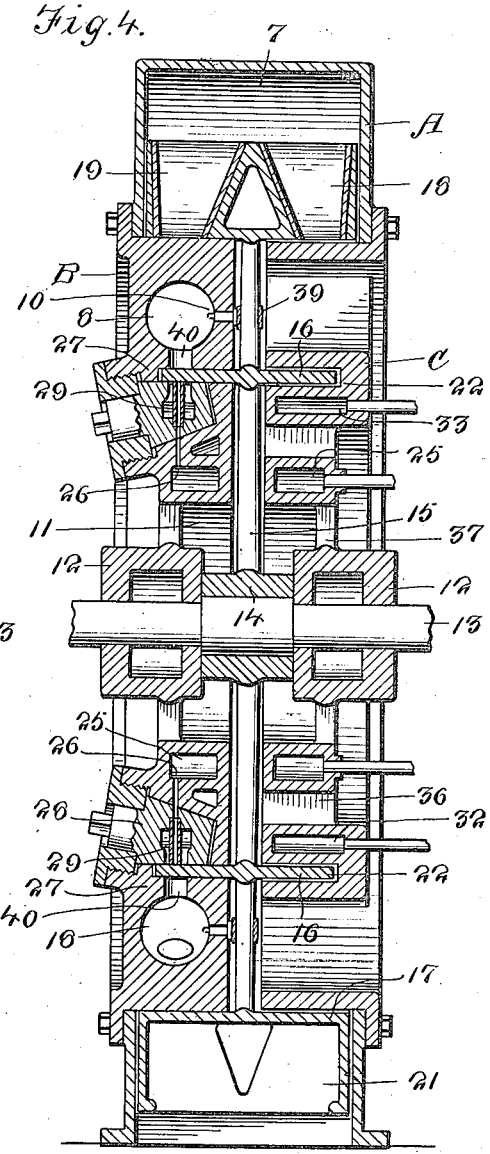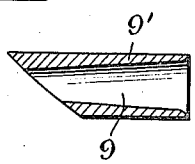

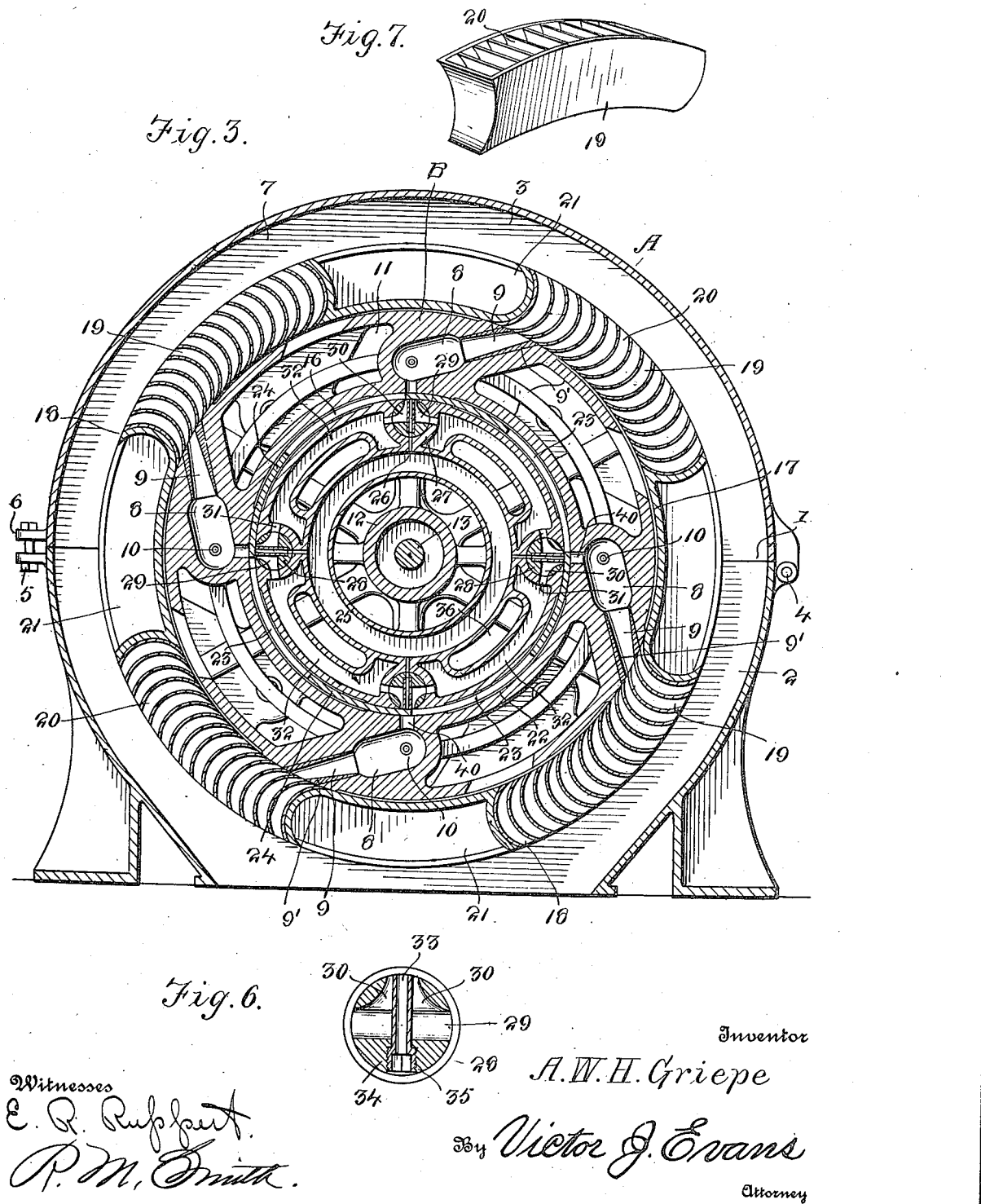

UNITED STATES PATENT OFFICE.

AUGUSTUS W. H. GRIEPE, OF NEW YORK, N. Y., ASSIGNOR TO TURBO CO., A CORPORATION OF NEW JERSEY.

INTERNAL-COMBUSTION TURBINE-ENGINE.

1,150,361.  Specification of Letters Patent.  Patented Aug. 17, 1915.

Application filed February 17, 1914. Serial No. 819,252.

*To all whom it may concern:*

Be it known that I, AUGUSTUS W. H. GRIEPE, a citizen of the United States, residing at New York, in the county of Bronx and State of New York, have invented new and useful Improvements in Internal-Combustion Turbine-Engines, of which the following is a specification.

This invention relates to internal combustion turbine engines, the object of the invention being to simplify and improve the construction set forth and described in my prior Patent No. 910,665 dated January 26, 1909, whereby the general efficiency, power and accessibility are increased to a very considerable extent.

One of the principal aims of the present invention is to provide means whereby quick access may be had to the vital working parts of the engine without necessitating the disassembling of a large number of elements.

A further object of the invention is to make provision whereby the burned gases are expelled from the combustion or expansion chambers preparatory to the introduction of charges of fresh gas therein.

A further object of the invention is to so construct and arrange the admission valves that wear on the injector nozzles may be compensated for without disarranging the parts of said valves.

A further object of the invention is to so construct and arrange the several parts of the motor that they may be readily air-cooled and new vane or blade sections introduced whenever and wherever necessary.

With the above and other objects in view, the invention consists in the novel construction, combination and arrangement of parts, as will hereinafter be more fully described, illustrated and claimed.

In the accompanying drawings:—Figure 1 is a side elevation of an internal combustion turbine engine embodying the present invention. Fig. 2 is an end elevation of the same. Fig. 3 is a vertical longitudinal section through the engine. Fig. 4 is a vertical diametrical section through the same. Fig. 5 is a detail longitudinal section through one of the admission valves and air jets. Fig. 6 is a cross section on the line 6—6 of Fig. 5. Fig. 7 is a detail perspective view of one of the vane sections. Fig. 8 is an enlarged detail section of one of the discharge nozzles.

The turbine engine contemplated in this invention comprises essentially a stationary outer casing designated generally by the reference character A, the said casing being divided along a diametrical line 1 into a lower or base section 2 and an upper section 3, both of said sections being substantially semi-cylindrical and being hinged together at 4 at one side as shown in Figs. 1 and 3. At the opposite side the sections are connected together by any convenient means such as by one or more bolts 5 passing through lugs 6 on the upper and lower sections of the casing. This casing is made of sufficiently greater internal diameter than the greatest diameter of the rotor hereinafter referred to so as to leave a final expansion or exhaust chamber 7 annular in form and communicating with a suitable outlet to the atmosphere.

In addition to the stationary casing A, the engine comprises the two similar body sections B and C as shown in Fig. 4, each of said sections B and C being formed with a circular series of combustion or explosion chambers 8 having constricted and outwardly tapering and narrowing discharge portions 9, a spark plug 10 being used in connection with each of said combustion chambers 8. Between the combustion chambers 8, the members B and C are hollowed out or chambered as indicated at 11 to lighten the structure and allow for a free circulation of air for cooling purposes. In this connection it is to be noted that the outer or side walls of the combustion chambers 8 are exposed to direct contact with the immediately surrounding atmosphere which has a decided cooling effect thereon and does away with the necessity of using water and water jackets.

Inserted in each of the constricted discharge portions 9 of the explosive chambers 8 is an expansion or discharge nozzle 9' illustrated in detail longitudinal section in Fig. 8, each of said nozzles being held in place when adjusted by means of a screw 9'' (see Fig. 1). This enables the outer discharge end of said nozzle to be adjusted in close bearing contact with the adjacent wall of the rotor so as to prevent leakage of the expanding gas at such point.

The sections B and C are also formed with central bearings 12 for the rotor shaft 13 which is arranged centrally of the engine and has fast thereon the hub 14 of a rotor comprising the central web-like body 15 and carrying oppositely extending flanges forming a valve band 16 the purpose of which will presently appear. On the outer periphery of the web-like body 15 there is arranged a rotor rim 17 which is formed with pockets 18 to receive vane or blade sections 19, four of which are shown in Fig. 3, each of said vane sections being substantially rectangular in plan and curved longitudinally to agree with the curvature of the rim 17, the open center of the section 19 being provided with any suitable number of curved vanes 20 which extend transversely of the rotor rim and which move across the discharge end of the several expansion chambers 8 above referred to. By forming the vane sections in separable pieces as indicated, a new vane section may be substituted for an old one whenever necessary without reconstructing the entire rotor or using a new one. Blank spaces 21 are left opposite the vane sections 19 and the combustion chambers 8 at one side of the engine are staggered or alternated with those at the opposite side so that there is a continuous expansion of ignited gases throughout the entire revolution of the engine thus producing an even torque and reducing vibration to a minimum.

The valve band 16 is received in recesses or grooves 22 in the body sections B and C as clearly shown in Figs. 3 and 4 and said valve band is provided with slots or admission ports 23 extending longitudinally thereof and imperforate portions 24 which serve to cut off the flow of gas to the combustion chambers 8 during the period of ignition and expansion. Near the center of each body section B and C there is an annular air chamber 25 to which air is admitted under pressure. Leading from said annular air chamber 25 outwardly are air passages 26 which communicate with substantially cylindrical admission valve casings 27 there being one of such casings and one of such admission valves for each combustion chamber in each body section B and C. In each chamber 27 is mounted a tapered plug valve 28 one of which is illustrated in detail in Fig. 5. This plug valve is formed with a central gas passage 29 and branches 30 extending in opposite directions therefrom and communicating through ports 31 in the casing 27 with gas containing pockets or spaces 32 in the body sections B and C. Extending centrally through the passage 29 is an air jet tube 33 the discharge end of which bears in contact with the inner surface of the valve band 16 as shown in Figs. 3 and 4. At its inner end the tube 33 is threaded as shown at 34 and screwed into a corresponding internally threaded socket 35 in the body of the plug valve 28. The compressed air in the annular chamber 25 in being forced through the jet tube 33 takes up the gas flowing into the passage 29 and forms an explosive mixture which is carried through one of the slots or ports 23 into the combustion chamber 8 at the proper time. By reason of the construction just described, the jet tube 33 may be adjusted as wear takes place on the discharge end thereof, it being important to maintain close contact between the tube 33 and the valve band 16 to prevent leakage of gas.

It is to be further noted that the longitudinal axes of the admission valves are slightly oblique to a horizontal line as shown in Fig. 4, this being done in order to bring the outer surfaces of the tapered bodies of the plug valves in parallel relation to and contact with the inner surface of the valve band 16 as clearly shown in Fig. 4.

Air circulating spaces 36 are provided between the air chamber 25 and gas pockets 32 so as to allow air to pass through the body sections B and C, the air also being admitted through the spaces 37 adjacent to and surrounding the bearings 12 and between the spokes 38 which connect the outer and inner portions of the body sections B and C as shown in Figs. 3 and 4. Commutator rings or bands 39 are secured to opposite faces of the body 15 of the rotor and furnish the necessary current to the spark plugs 10 so as to cause ignition at the proper periods of time.

From the foregoing description the operation of the engine will now be understood. Gas is admitted through one or more pipe connections to the spaces or pockets 32 and air under compression is constantly furnished to the annular air chamber 25. When the slots or ports 23 register with the ports 40 leading to the combustion chambers 8, the compressed air rushes through the passages 26 and takes up the proper quantity of gas which passes through the ports 31 and the passage 29 and the mixture thus obtained is carried under compression into the several combustion chambers. Later the imperforate portions 24 of the valve band 16 cover and close the ports 40 and ignition then takes place, the expanding gases impinging against the vanes 20 and imparting rotary motion to the rotor. Just before the vane section passes beyond the discharge end of the respective combustion chamber, the port or slot 23 opens up communication between the passage 26 and said combustion chamber and sufficient air is allowed to pass into the combustion chamber 8 to force out old or burned gases. Immediately thereafter the rim 17 closes or covers the discharge end of the combustion chamber which is then recharged with compressed gas in the manner described.

By locating the air and gas chambers centrally as described and shown, the mixture is heated and rendered more combustible, thus doing away with the use of a carbureter.

What I claim is:—

1. In an internal combustion turbine engine, the combination with a body having a circular series of combustion chambers, of a rotor comprising an annular rim, a circular series of vanes carried by said rim, and a discharge nozzle for each of said combustion chambers lying in contact with the inner face of said rim, said discharge nozzle being adjustable relatively to said rim, and a set screw for holding said nozzle when adjusted.

2. An internal combustion turbine engine comprising a pair of circular body sections each provided with a circular series of outwardly discharging combustion chambers and also provided with compressed air and gas passages, tapered plug valves interposed between said air and gas passages and said combustion chambers, a rotor operating between said body sections, series of vanes carried by said rotor and revolving around said body sections, a valve band carried by said rotor and provided with ports in the form of slots extending longitudinally of said band and adapted to register periodically with said combustion chambers, each of said plug valves embodying a gas passage in the center thereof, and a compressed air jet tube extending through said plug obliquely to the axis of the latter and perpendicular to the working face thereof and also through the gas passage therein, said tube being threaded into said plug and adjustable toward and lying in contact with said valve band.

In testimony whereof I affix my signature in presence of two witnesses.

AUGUSTUS W. H. GRIEPE.

Witnesses:
  GEORGE W. RYAN,
  WM. H. CONSIDENE.